(12) United States Patent
Olbrich et al.

(10) Patent No.: US 8,290,687 B2
(45) Date of Patent: Oct. 16, 2012

(54) PROCEDURE FOR DETERMINING THE INJECTED FUEL MASS OF A SINGLE INJECTION AND DEVICE FOR IMPLEMENTING THE PROCEDURE

(75) Inventors: Stephan Olbrich, Stuttgart (DE); Wolfgang Beuer, Steyr (AT); Andreas Sommerer, Kernen (DE); Steffen Meyer-Salfeld, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 384 days.

(21) Appl. No.: 12/507,487

(22) Filed: Jul. 22, 2009

(65) Prior Publication Data
US 2010/0030454 A1    Feb. 4, 2010

(30) Foreign Application Priority Data

Jul. 23, 2008    (DE) .................... 10 2008 040 626

(51) Int. Cl.
*F02M 3/00* (2006.01)
*F02M 43/00* (2006.01)
*G06F 17/00* (2006.01)
*G01F 9/00* (2006.01)

(52) U.S. Cl. .................. 701/104; 73/114.48; 123/299; 123/300; 123/304

(58) Field of Classification Search .................. 123/674, 123/299, 300, 304; 701/101, 102, 103, 104, 701/106, 109, 112, 114, 115; 702/182–185
See application file for complete search history.

(56) References Cited

U.S. PATENT DOCUMENTS

| | | | |
|---|---|---|---|
| 6,085,142 A * | 7/2000 | Di Leo et al. ................. | 701/104 |
| 6,279,560 B1 * | 8/2001 | Mauro et al. .................. | 123/674 |
| 6,584,962 B2 * | 7/2003 | Nonomura et al. ........... | 123/491 |
| 6,698,396 B2 * | 3/2004 | Pfaeffle et al. ................ | 123/299 |
| 6,745,620 B2 * | 6/2004 | Kreikemeier et al. ..... | 73/114.72 |
| 6,755,176 B2 * | 6/2004 | Takeuchi et al. .............. | 123/299 |
| 6,801,847 B2 * | 10/2004 | Jaliwala et al. ............... | 701/104 |
| 6,964,261 B2 * | 11/2005 | Warne et al. .................. | 123/436 |
| 6,988,030 B2 * | 1/2006 | Asano et al. .................. | 701/103 |
| 6,990,958 B2 * | 1/2006 | Asano et al. .................. | 123/436 |
| 7,021,288 B2 * | 4/2006 | Asano et al. .................. | 123/435 |
| 7,319,930 B2 * | 1/2008 | Dietl et al. .................... | 701/104 |
| 7,343,240 B2 * | 3/2008 | Sugiyama et al. ............ | 701/104 |
| 7,359,792 B2 * | 4/2008 | Nishie .......................... | 701/104 |
| 7,363,912 B2 * | 4/2008 | Asano et al. .................. | 123/436 |
| 7,588,515 B2 * | 9/2009 | Miyazaki ...................... | 477/111 |
| 7,628,146 B2 * | 12/2009 | Kloppenburg et al. ....... | 123/673 |
| 7,729,845 B2 * | 6/2010 | Iwashita et al. ............... | 701/104 |
| 7,841,319 B2 * | 11/2010 | Thomas ......................... | 123/478 |
| 7,845,343 B2 * | 12/2010 | Imai .............................. | 123/674 |
| 7,881,857 B2 * | 2/2011 | Samenfink et al. ........... | 701/105 |
| 7,895,990 B2 * | 3/2011 | Ishizuka et al. ............... | 123/478 |
| 7,899,603 B2 * | 3/2011 | Yamamoto et al. ........... | 701/104 |
| 8,010,277 B2 * | 8/2011 | Ishizuka et al. ............... | 701/114 |

(Continued)

*Primary Examiner* — Stephen K Cronin
*Assistant Examiner* — Raza Najmuddin
(74) *Attorney, Agent, or Firm* — Merchant & Gould P.C

(57) ABSTRACT

A method for determining a fuel mass of a single injection that has been injected into at least one combustion chamber of a combustion engine with at least one injection under high pressure. The method includes determining a correction variable for the single injection with the aid of a comparison of a measure for the actual amount of the injected fuel of at least one test injection, which takes place due to a measure for a default nominal amount of a desired single injection, and a measure for the nominal amount of the test injection. The method additionally includes executing a plurality of timely directly successive test injections.

15 Claims, 1 Drawing Sheet

U.S. PATENT DOCUMENTS

2008/0103676 A1* 5/2008 Ancimer et al. .............. 701/103
2009/0093948 A1* 4/2009 Richert et al. ................ 701/103
2009/0281710 A1* 11/2009 Mallebrein et al. ........... 701/104
2011/0137541 A1* 6/2011 Malikopoulos ............... 701/106
2011/0202255 A1* 8/2011 Hauser ......................... 701/103

* cited by examiner

PROCEDURE FOR DETERMINING THE INJECTED FUEL MASS OF A SINGLE INJECTION AND DEVICE FOR IMPLEMENTING THE PROCEDURE

TECHNICAL FIELD

The invention relates to a procedure for determining a fuel mass of a single injection that is injected in at least one combustion chamber of a combustion engine as well as a device for implementing the procedure according to the category of the independent claims. By 'single injection' the invention means a single injection for example a pre-, a main- and an after-injection.

Subject matter of the invention is also a computer program and a computer program product with a program code, which is saved on a machine readable device for implementing the procedure.

BACKGROUND

For operating modern combustion engines, in particular self-igniting diesel engines, a highly accurate metering of the fuel mass is required at very high injection pressures. The precision of the controlled fuel metering is however limited at modern injection systems on the one hand by the manufacturing accuracy and on the other hand by characteristics of the components of the injection system that change during the lifetime, in particular drifting appearances, which for example cause increased tolerances. In a given case now the aimed accuracy might not be sufficient in order to fulfill the motoric requirements. In particular inaccuracies of the pre-injection can cause significantly increased emissions, for example in partial-load operation, or to conspicuous and therefore disturbing combustion noises depending on the operating point. Therefore there is a great interest to know the injected fuel mass exactly and in particular to know the deviations of the real injection amount that actually occurs during the operation of the combustion engine from the desired injection amount, in order to be able to carry out corresponding corrections of the controlling of the injection valves and thus to be able to ensure a correct injection amount.

A procedure and a device of the category-like type is known from DE 10 2006 061 683.9, at which a correction variable is determined for the injection with the aid of comparison of a measure for the actual amount of the injected fuel of at least one after-injection, which is carried out due to a measure for a default nominal amount of a desired injection, and the measure for the nominal amount of this test-after-injection. The parameters of the controlling of the injection valves are corrected with the aid of the correction variable and thereby a correct injection amount is ensured.

The basis of the procedure is therefore to determine the amount of the after-injections from the difference of the lambda signal in normal operation and the lambda signal in the operation of the additional late and therefore torque-neutral after-injection amount. Now it has proven that the underlying measuring effect is weakened with an increasing size of the combustion engine and that the accuracy and resolution of the lambda probe is too low for a cylinder-individual determination of partial injection amounts in the lower milligram-range.

SUMMARY

The procedure according to the invention with the features of the independent claim 1 allows to exactly determine the fuel mass of a single injection that has been injected in at least one combustion chamber of a combustion engine with at least one injection under high pressure. This takes place thereby that a correction variable is determined for the single injection with the aid of a comparison of a measure for the actual amount of the injected fuel of a number of successive test injections, which are carried out due to a measure for a default nominal value of a single injection, and the measure for the nominal amount of the test injection. With the aid of this correction variable the parameters of the controlling of the injection valves can be corrected and thereby a correct injection amount can be ensured. In other words the procedure allows to determine the relation between the actual and desired injection amount of the test injection from the actually injected fuel mass of the test injection, whose injection amount is preferably so selected, that each preferred amount corresponds with the amount of the desired single injection, and to derive the correction variable for the injection valves, in order to ensure a correct injection amount for the single injection in all engine operating areas.

The amount that is assigned to a single injection is therefore injected several times, in order to increase thereby the entire amount of the additional injection. That causes an increase of the underlying measuring effect, which on the other hand results therein that the requirements for the resolution of the lambda signal get lower so that the accuracy and resolution of the lambda probe that is present in the state of the art is sufficient.

An advantageous configuration of the procedure provides to inject as many test injections as possible that have to be determined and correspond with the single injection as torque-neutral after-injections.

The maximum after-injection and number if test-injections are determined depending on the operation point.

Another possibility provides to inject as many test injections as possible as pre-injections in overrun mode that have to be determined and that correspond with the single injection.

According to a preferred embodiment it is provided to determine the measure for the actual amount from a lambda signal that is measured in the exhaust gas area. With this step the sensor signal that is arranged in the exhaust gas area and that is provided anyway for the engine control or regulation can be used for determining the measure for the actual amount.

Another possibility provides a calculation of the air ratio lambda that occurs in the exhaust gas area.

According to one embodiment it is provided to determine the correcting variable in the course of a periodically occurring learning procedure, which is carried out in default operating statuses of the combustion engine.

Preferably the correcting variables and the measures for the actual amount of the injected fuel as well as for the nominal amount of the injected fuel that have been determined in the course of the learning procedure are stored in a learning characteristic diagram, which can be accessed later in operation easily.

The injected fuel amount or a variable that characterizes the injected fuel amount, for example the control duration can be used as measure for the injected fuel mass.

In a first configuration of the procedure the test injections for the determining the correction variable can be injected into a combustion chamber of a combustion engine that provides at least one combustion chamber. In doing so a learning characteristic diagram can be determined injector-individually so that a cylinder-individual correction of the single injection is possible.

Another configuration provides to determine the correcting variable due to test injections into all combustion chambers of a combustion engine that comprises several combustion chambers. This step has the advantage that the average deviation of all injectors is determined by the nominal value and can be corrected correspondingly.

As mentioned test pre-injections or test after-injections can be used as test injections, which are injected cylinder-individually or simultaneously at all cylinders.

The device according to the invention for operating a combustion engine relates at first to a control unit, which is customized for implementing the procedure. The control unit comprises preferably at least one electric storage, in which the steps of the procedure are stored as computer program. The control unit furthermore comprises preferably a special storage, in which the different values of the correcting variable are stored.

The device provides furthermore preferably a device for determining the maximum number of test injections of the amount that has to be determined, which does not influence the engine operation negatively.

BRIEF DESCRIPTION OF THE DRAWINGS

Embodiments of the invention are illustrated in the drawing and further explained in the subsequent description.

The drawing shows in.

DETAILED DESCRIPTION

Figure 1:
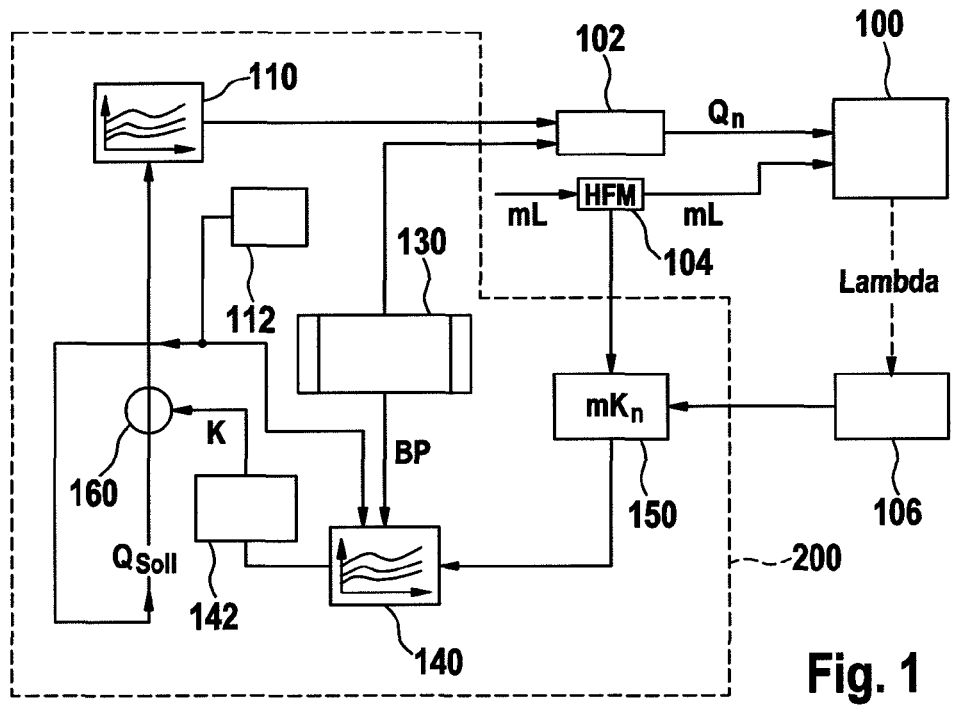
FIG. 1 shows the procedure according to the invention in the form of function blocks.

FIG. 1 shows function blocks, which qualify for implementing a procedure according to the invention for operating a combustion engine. FIG. 1 illustrates a combustion engine 100, which preferably comprises several combustion chambers, for example four combustion chambers, into which fuel is injected with the aid of injectors. The combustion engine 100 is furthermore supplied with an air mass mL, which is detected with the aid of a suitable device 104, for example with the aid of a hot film mass meter HFM according to a familiar way.

The controlling of the injectors 102 takes place steered with the aid of a control duration characteristic diagram 110, from which a control duration of the injectors 102 that is assigned to a desired nominal amount $Q_{Soll}$, with which the fuel is injected into the combustion chambers, can be taken. A highly precise metering of the fuel mass at very high injections pressures is now required for regulating the diesel combustion engine 100. The achievable accuracy of the controlled fuel metering at modern injection systems is however limited on the one hand by the manufacturing accuracy and on the other hand by a drifting of the components during the operation of the combustion engine, for example due to wear and such alike. In particular inaccuracies of pre-injections VE result in significantly increased emissions depending on the operating point, for example in partial load, or in conspicuous combustion noises.

The basic idea of the invention now is to determine deviations of the actual injection amounts from the desired injection amount during normal driving mode or in boost operation with the aid of several after-injections or pre-injections in boost operation that are timely directly successive, late and comparable, and to provide them to the engine control. This information enables a correction of the controlling of the injectors 102. In doing so also a minimization of the tolerances of the injection system is made possible.

In order to determine now the actually injected fuel mass very precisely and in doing so to be able to carry out a correction of the injection amount the invention provides the determination of the actual injection amount and the storage of the relation between the actual and desired injection amount in the learning characteristic diagram at a number of test injections, which are preferably carried out as not torque-effective after-injections in the engine operation or pre-injections in boost operation. This takes place according to the subsequently further described way.

A learning operating coordinator 130, which is part of a control unit 200, induces the controlling of the injector 102, with which fuel is injected into a combustion chamber of the combustion engine 100 during the test injection $Q_n$. Simultaneously the injected air mass mL is determined with the aid of the hot film mass meter 104 and the air ratio lambda detected by for example a lambda probe 106 and from those variables the actually injected fuel mass $mK_n$ is calculated in an arithmetic unit 150 during the test injections. This fuel mass $mK_n$ is stored in the learning characteristic diagram 140.

A change of lambda due to the injections due to the injections can be for n injections the relation $$\text{Delta}(a/\text{lambda}) = (14.5 \times n \times mk_n \times Eta)/mL,$$

whereby Eta illustrates a variable that defines a detection rate, which is for example determined empirically and which takes the fact into account that if the injections are carried out as very late after-injections, they do not combustion completely anymore and depending on the configuration of the lambda probe 106 only low HC-concentrations can be completely converted and detected. The measure for the detection rate Eta allows an explicit picture between the actually injected amount of the test injections $mK_n$ and the lambda signal.

Now the difference or relation between the so determined and a required fuel mass $mK_{n,Soll}$ of the test injections is determined and stored in the learning characteristic diagram 140, whose coordinates sufficiently characterize the corresponding operating point BP of the injection valve. Alternatively also the control parameters that belong to the measured actual fuel mass can be stored. As an equivalent to that also the storage of the correction of these parameters that is necessary as opposed to the nominal control parameters is possible, in order to achieve the desired injection amount.

The idea of the present invention is to inject additional test injections several times. The total amount of the additional injection is hereby increased, which causes an increased signal lift. Thereby the requirements to the resolution of the lambda signal get lower.

The total error $e_{ges}$ basically depends on the oxygen concentration and the air mass. Both change by the additionally injected amount only insignificantly. The partial injections are preferably so selected that the same sized amounts are injected. If that is the case the following applies for the single injection at n partial injections: $mK_n = mK_{ges}/n$. The total error $e_{ges}$ distributes itself on the single injections as follows: $e_n = e_{ges}/n$. The error of a single injection at an after-injection or pre-injection that is separated into n parts is therefore significantly reduced as opposed to a single injection.

The control unit provides a circuit device or a corresponding sub-program, which allows a decision about how many partial injections are possible and in what periods they should be injected. The selection of those parameters, which means the amount of the partial injection and their time interval are so selected, that a minimal influence is caused by hydraulic effects in the injection system, for example pressure waves, until an angle area of the crankshaft is provided that is as big as possible. Also the amounts $m_e$ of the test injections are determined in this learning operation coordinator, which result from the total amount $mK_{ges}$ divided by the number of injections n: $mK_n = mK_{ges}/n$.

Figure 2:
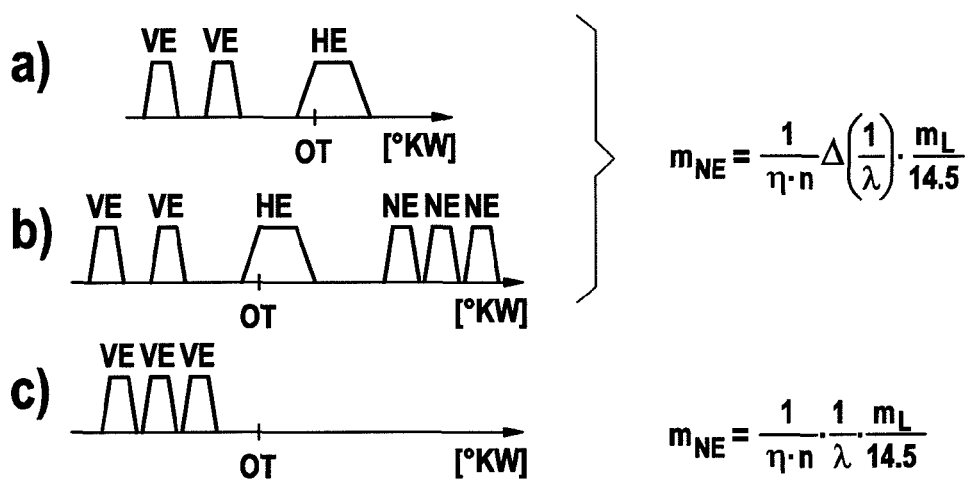
FIG. 2 shows schematically injections according to the invention's procedure.

FIG. 2 schematically shows an injection diagram.

In the upper part, labeled with a), the injection diagram is stated with two pre-injections VE and a main injection HE above the crankshaft angle KW. The main injection takes approximately place in the area of the upper dead center OT.

The middle part, FIG. 2b, shows the procedure according to the invention with two pre-injections VE, the main injection HE and the majority of the same torque-neutral after-injections NE. The amount of after-injections is calculated with the aid of the above illustrated equation.

The lower part, FIG. 2c, shows the procedure according to the invention with three pre-injections VE in boost operation. The amount of pre-injections is calculated with the aid of the above illustrated equation.

The presently described procedure has been explained with the aid of the injection of fuel mass in to a combustion chamber of a combustion engine that comprises several combustion chambers. The injection into a combustion engine allows the determination an injector-individual learning characteristic diagram 140.

But it has to be understood that the procedure is not limited to that. It is moreover also possible to carry out the after-injection in all cylinders simultaneously. In doing so the average deviation of all injectors 102 from the nominal value can be determined and stored in the learning characteristic diagram 140.

A second component of the here described function provides the application of the learned. The relations that have been thus learned at test injections, whose parameter are subject matter of the learning characteristic diagram 140 are subsequently considered in normal operation of the combustion engine when determining the amount of the injections.

The demanded fuel mass $Q_{Soll}$ is determined in an injection determining device 112. With the aid of $Q_{Soll}$ the correction variable is read from the characteristic diagram 140. An adjustment of the correcting variable to the actual operating point takes place in a circuit device 142, if for example the test injection took place as after-injection and a correction of the pre-injection or the main injection should take place, or if reversed the test injection took place as pre-injection and a correction of the after-injection or the main injection should take place. In that case the correction variable that can be taken from the characteristic diagram 140 has to be adjusted to the corresponding injection type.

Ultimately the desired amount of the nominal injections is thereby changed by the correction variable K in so far that the actually injected amount is again equivalent to the original amount demand.

The measure for the injected fuel mass can be the fuel amount itself, as described above. But instead of a deviation between the nominal and actual fuel amount for determining the correct actual mass it is also possible to determine and store the necessary control duration correction. The storing of the correction values of the control duration correction can thereby take place similar to the so-called null set correction. Alternatively the learning characteristic diagram can be arranged in such a way that the required control parameters (for example control duration) or the corresponding correction as opposed to the nominal control parameters are stored besides the actual fuel mass.

Which of the two variants is actually used depends also on the achievable accuracy of the two variants.

The presently described procedure can for example be implemented and run as computer program on an arithmetic unit, in particular the control unit 200 of a combustion engine 100. The program code can be stored on a machine-readable device, which the control unit 200 can read. The procedure that has been previously described in connection with FIG. 2 can insofar also be implemented as computer program.

The invention claimed is:

1. A method for determining a fuel mass of a single injection injected into at least one combustion chamber of a combustion engine with at least one injection under high pressure, the method comprising:
    determining a correction variable for the single injection by a comparison of a measure for an actual amount of injected fuel of at least one test injection, wherein the at least one test injection occurs due to a measure for a default nominal amount of a desired single injection and a measure for a nominal amount of the test injection; and
    executing a plurality of timely directly successive test injections, wherein a fuel mass of the directly successive test injections is equivalent to the fuel mass of the single injection to be measured.

2. The method of claim 1, further comprising determining a maximum test injection amount and a number of the directly successive test injections and their timely course depending on an operating point.

3. The method of claim 1, determining the measure for the actual amount from a lambda signal measured in an exhaust gas area.

4. The method of claim 1, further comprising determining the correction variable in a course of a learning procedure executed in default operating statuses of the combustion engine.

5. The method of claim 4, further comprising storing the correction variable and the measures for the actual amounts of the injected fuel and a nominal amount of the injected fuel determined in the course of the learning procedure in a learning characteristic diagram.

6. The method of claim 1, wherein the measure for the injected fuel mass is the fuel amount or a control duration of a fuel injector.

7. The method of claim 1, further comprising determining the correction variable due to test injections into a combustion chamber of the combustion engine that comprises at least one combustion chamber.

8. The method of claim 1, further comprising determining the correction variable due to pre- and after-injections in the at least one combustion chamber of the combustion engine that comprises several combustion chambers.

9. A device for operating a combustion engine, comprising at least one control unit configured for implementing a method for determining a fuel mass of a single injection injected into at least one combustion chamber of a combustion engine with at least one injection under high pressure, the method comprising:
    determining a correction variable for the single injection by a comparison of a measure for an actual amount of injected fuel of at least one test injection, wherein the at least one test injection occurs due to a measure for a default nominal amount of a desired single injection and a measure for a nominal amount of the test injection; and
    executing a plurality of timely directly successive test injections, wherein a fuel mass of the directly successive test injections is equivalent to the fuel mass of the single injection to be measured.

10. The device of claim 9, wherein the control unit comprises at least one correcting variable storage that stores correcting values determined during a learning procedure.

11. The device of claim 10, wherein the correcting variable storage is a learning characteristic diagram.

12. The device of claim 9, further comprising a learning operating coordinator for determining a maximum amount of test injections of the amount to be determined, that do not negatively influence engine operation.

13. The device of claim 10, further comprising a circuit device for adjusting the correcting values to an actual operating point in a case of the test injection being an after-injection for correcting a pre-injection or a main injection or in a case of the test injection being a pre-injection for correcting the after-injection or the main injection.

14. A computer-implemented method for determining a fuel mass of a single injection injected into at least one combustion chamber of a combustion engine with at least one injection under high pressure, the computer-implemented method comprising: determining a correction variable for the single injection by a comparison of a measure for an actual amount of injected fuel of at least one test injection, wherein the at least one test injection occurs due to a measure for a default nominal amount of a desired single injection and a measure for a nominal amount of the test injection; and executing a plurality of timely directly successive test injections, wherein a fuel mass of the directly successive test injections is equivalent to the fuel mass of the single injection to be measured.

15. A computer program product with a program code that is stored on a non-transitory machine-readable device and executed on a computer of a control unit, for determining a fuel mass of a single injection injected into at least one combustion chamber of a combustion engine with at least one injection under high pressure, the program code including instructions for: determining a correction variable for the single injection by a comparison of a measure for an actual amount of injected fuel of at least one test injection, wherein the at least one test injection occurs due to a measure for a default nominal amount of a desired single injection and a measure for a nominal amount of the test injection; and executing a plurality of timely directly successive test injections, wherein a fuel mass of the directly successive test injections is equivalent to the fuel mass of the single injection to be measured.

* * * * *